United States Patent [19]

Snelling

[11] Patent Number: 4,837,591

[45] Date of Patent: Jun. 6, 1989

[54] HIGHLIGHT COLOR IMAGING BY DEPOSITING POSITIVE AND NEGATIVE IONS ON A SUBSTRATE

[75] Inventor: Christopher Snelling, Penfield, N.Y.

[73] Assignee: Xerox Corporation, Stamford, Conn.

[21] Appl. No.: 189,498

[22] Filed: May 2, 1988

[51] Int. Cl.[4] .............................................. G01D 15/00

[52] U.S. Cl. .................................... 346/159; 346/157; 346/160.1

[58] Field of Search ............ 346/159, 158, 157, 160.1; 355/4, 3 CH, 3 DD; 400/119; 358/300

[56] References Cited

U.S. PATENT DOCUMENTS

| | | | |
|---|---|---|---|
| 4,078,929 | 3/1978 | Gundlach | 96/1.2 |
| 4,087,826 | 5/1978 | Hauberle | 346/155 |
| 4,155,093 | 5/1979 | Fotland et al. | 346/159 |
| 4,409,604 | 10/1983 | Fotland | 346/159 |
| 4,463,363 | 7/1984 | Gundlach et al. | 346/159 |
| 4,584,592 | 4/1986 | Tuan et al. | 346/159 |
| 4,660,059 | 4/1987 | O'Brien | 346/157 |
| 4,727,388 | 2/1988 | Sheridon et al. | 346/159 |

FOREIGN PATENT DOCUMENTS

| | | | |
|---|---|---|---|
| 62175778 | of 0000 | Japan | 346/159 |

*Primary Examiner*—Arthur G. Evans

[57] ABSTRACT

A method and apparatus for selectively depositing positive and negative ions on a receptor. In the preferred embodiment, the ions are deposited in image configuration from a single source of both positive and negative ions. The positive and negative images are subsequently developed with different color toners in order to form a highlight color image.

10 Claims, 1 Drawing Sheet

HIGHLIGHT COLOR IMAGING BY DEPOSITING POSITIVE AND NEGATIVE IONS ON A SUBSTRATE

BACKGROUND OF THE INVENTION

This invention relates generally to electrostatic imaging and more particularly to highlight color imaging utilizing ion projection or ionography for depositing positive and negative ions on a charge receptor in image configuration.

In the practice of black and white xerography, the most common form of electrostatic imaging, it is the general procedure to form electrostatic latent images on a xerographic surface by first uniformly charging a photoconductive insulating surface or photoreceptor. The charge is selectively dissipated in accordance with a pattern of activating radiation corresponding to original images. The selective dissipation of the charge leaves a latent charge pattern on the imaging surface corresponding to the areas not struck by radiation.

This charge pattern is made visible by developing it with toner. The toner is generally a colored powder which adheres to the charge pattern by electrostatic attraction. The developed image is then fixed to the imaging surface or is transferred to a receiving substrate such as plain paper to which it is fixed by suitable fusing techniques.

Multi-color imaging has also been accomplished utilizing basic xerographic techniques. In this instance, the foregoing process is essentially repeated for three or four cycles. Thus, the charged photoconductive surface is successively exposed to filtered light images. After each exposure the resultant electrostatic latent image is then developed with toner particles corresponding in color to the subtractive primary of the filtered light image. For example, when a red filter is employed, the electrostatic latent image is developed with toner particles which are cyan in color. The cyan toner powder image is then transferred to the copy sheet. The foregoing process is repeated for a green filtered light image which is developed with magenta toner particles and a blue filtered light image which is developed with yellow toner particles.

Each differently colored toner powdered image is sequentially transferred to the copy sheet in superimposed registration with the powder image previously transferred thereto. In this way, three toner or more powder images are transferred sequentially to the copy sheet. After the toner powder images have been transferred to the copy sheet, they are permanently fused thereto.

The foregoing color imaging process is known as full color imaging. Another color imaging process is known as highlight color imaging. In highlight color imaging two different color developers are customarily employed, usually black and some other color, for example, red. In one type of highlight color imaging, a tri-level image is formed on the imaging surface utilizing a three level ROS (Raster Output Scanner) to form the tri-level image on a charge retentive surface that had previously been uniformly charged. The tri-level image comprises two image areas and a background area.

The concept of tri-level xerography is described in U.S. Pat. No. 4,078,929 issued in the name of Gundlach. The patent to Gundlach teaches the use of tri-level xerography as a means to achieve single-pass highlight color imaging. As disclosed therein the charge pattern is developed with toner particles of first and second colors. The toner particles of one of the colors are positively charged and the toner particles of the other color are negatively charged. In one embodiment, the toner particles are supplied by a developer which comprises a mixture of triboelectrically relatively positive and relatively negative carrier beads. The carrier beads support, respectively, the relatively negative and relatively positive toner particles. Such a developer is generally supplied to the charge pattern by cascading it across the imaging surface supporting the charge pattern. In another embodiment, the toner particles are presented to the charge pattern by a pair of magnetic brushes. Each brush supplies a toner of one color and one charge. In yet another embodiment, the development system is biased to about the background voltage. Such biasing results in a developed image of improved color sharpness.

In tri-level xerography, the xerographic contrast on the charge retentive surface or photoreceptor is divided three, rather than two, ways as is the case in conventional xerography. The photoreceptor is charged, typically to 900 v. It is exposed imagewise, such that one image corresponding to charged image areas (which are subsequently developed by charged area development, i.e. CAD) stays at the full photoreceptor potential ($V_{ddp}$ or $V_{cad}$,). The other image is exposed to discharge the photoreceptor to its residual potential, i.e. $V_c$ or $V_{dad}$ (typically 100v) which corresponds to discharged area images that are subsequently developed by discharged-area development (DAD). The background area is exposed such as to reduce the photoreceptor potential to halfway between the $V_{cad}$ and $V_{dad}$ potentials, (typically 500v) and is referred to as $V_w$ or $V_{white}$. The CAD developer is typically biased about 100v closer to $V_{cad}$ than $V_{white}$ (about 600v), and the DAD developer system is biased about 100v closer to $V_{dad}$ than $V_{white}$ (about 400v).

In addition to the techniques (i.e. conventional xerography and tri-level imaging) discussed above for forming the latent image, such images can alternately be formed by ion projection.

In commonly assigned U.S. Pat. No. 4,584,592 issued on Apr. 22, 1986 in the names of Hsing C. Tuan and Malcolm J. Thompson entitled, "Marking Head For Fluid Jet Assisted Ion Projection Imaging Systems", there is disclosed a marking array for use in conjunction with the marking head of an ion projection printer of the type disclosed in commonly assigned U.S. Pat. No. 4,463,363 issued on July 31, 1984 in the names of Robert W. Gundlach and Richard L. Bergen, entitled, "Fluid Jet Assisted Ion Projection Printing". In that printer, an imaging charge is placed upon a moving receptor sheet, such as paper, by means of a linear array of closely spaced minute air streams. Charged particles, comprising ions of a single polarity are generated in an ionization chamber of the marking head by a high voltage corona discharge and are then transported to and through the exit region of the marking head, where they are electrically controlled at each image pixel point, by an electrical potential applied to a modulating electrode. Selective control of the modulating electrodes in the array will enable spots of charge and absence of charge to be recorded on the receptor sheet for subsequent development.

A large area marking head for a page-width line printer would typically measure about 8.5 inches wide.

A high resolution marking array capable of printing 200 to 400 spots per inch would, therefore, include about 1700 to 3400 conductive metallic modulation electrodes. The entire array measuring on the order of 8.5 inches by 0.7 inches also would include a multiplexed addressing assembly comprising metallic address lines and data lines and amorphous silicon thin film active switching elements. All of these elements would be fabricated upon a single low cost substrate, such as glass.

In commonly assigned U.S. Pat. No. 4,727,388 issued in the name of Sheridon et al on Feb. 23, 1987 there is disclosed an improved ion modulation structure for an ionographic printer wherein the modulation structure comprises a marking array including a substrate upon which is integrally fabricated modulation electrodes, data buses, address buses and active thin film switches and the modulation electrodes comprise an alloy of aluminum and copper, the copper being in the range of 0.5% to 4%. Application of different potential values to the modulation electrodes enables control of the ion output in proportion to applied potential thereby permitting writing with a grey scale.

As illustrated in U.S. Pat. No. 4,660,059 issued in the name of John F. O'Brien, highlight color images are produced utilizing ion projection. As disclosed therein, an apparatus is used in which a document is printed in at least two different colors. Ions are projected onto the surface of a receiving member to record at least two electrostatic latent images thereon. Each of the electrostatic latent images recorded on the receiving member is developed with different color marking particles. The different color marking particles are transferred substantially simultaneously from the receiving member to the document to print the desired information thereon. The two different color images are formed in one embodiment of the invention by the use of a single ion projection device in a two-pass process. In the other embodiment, the two images are formed in a single pass but two ion projection devices are employed.

In commonly assigned U.S. patent patent application D/87051 (Attorney's Docket Number), there is disclosed an ion projection apparatus for forming tri-lelel images on a receptor for use in highlight color imaging.

U.S. Pat. No. 4,155,093 issued on May 15, 1979 discloses a device for the generation of charged particles, e.g. ions, by extraction from a high density source provided by an electrical gas breakdown in an electric field between two conducting electrodes separated by an insulator. When a high frequency electric field is applied, surprisingly high ion current densities can be obtained, providing numerous advantages over conventional ion forming techniques for use in electrostatic printing and office copying, as well as in electrostatic discharging, precipitation, separation and coating.

U.S. Pat. No. 4,409,604 issued on Oct. 11, 1983 discloses an electrostatic imaging device including an elongate conductor coated with a dielectric, and a transversely oriented conductor contacting or closely spaced from the dielectric-coated conductor. A varying potential between the two conductors results in the formation of a pool of ions of both polarities near the crossover area. Ions are selectively extracted by means of an extraction potential to form a discrete, well-defined charge image on a receptor surface.

Japanese publication No. 62-175778 relates to a high-speed recording device which performs recording through a simple mechanism by applying an AC voltage to a discharge electrode and generating positive and negative ions and applying an electric field to the ions selectively.

BRIEF SUMMARY OF THE INVENTION

The present invention provides a method and apparatus using ion projection to deposit both positive and negative ions, in image configuration, on a charge receptor surface. To this end, ions of positive and negative polarity are selectively extracted from a source of both polarities. Extraction of ions from the single source is accomplished by selectively applying either a positive or negative bias or no bias to the source of ions which establishes an electrostatic field for effecting deposition of ions of the correct polarity.

DETAILED DESCRIPTION OF THE PREFERRED EMBODIMENT OF THE INVENTION

Figure 1:
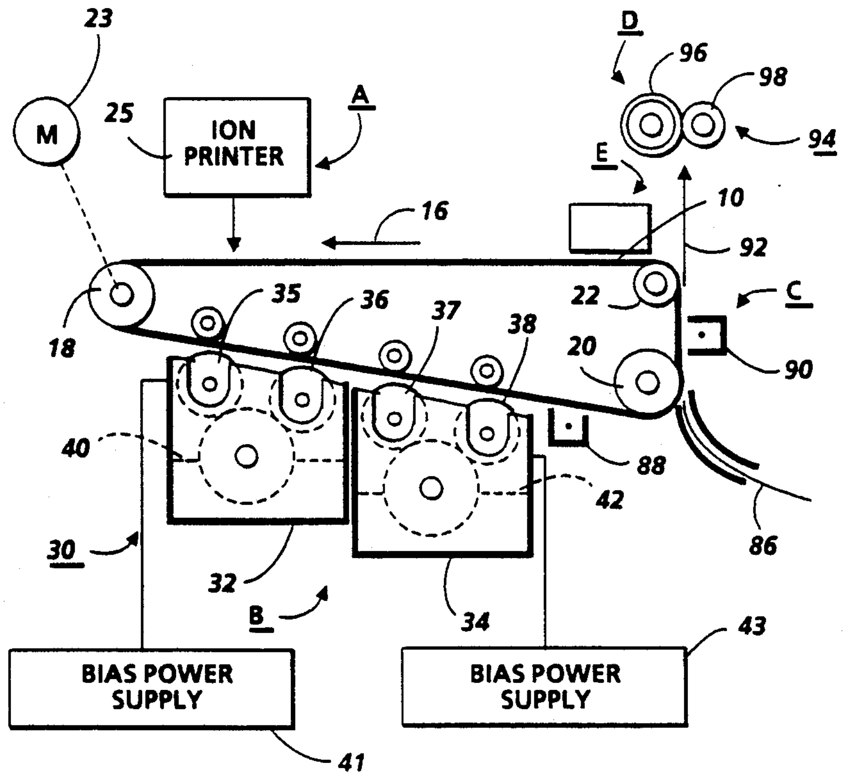
FIG. 1 is schematic illustration of a printing apparatus incorporating the inventive features of our invention.

As shown in FIG. 1, a printing machine incorporating my invention may utilize a charge retentive member or receptor in the form of a dielectric belt 10 mounted for movement past an imaging station A, developer station B, transfer station C and cleaning station E. Belt 10 moves in the direction of arrow 16 to advance successive portions thereof sequentially through the various processing stations disposed about the path of movement thereof. Belt 10 is entrained about a plurality of rollers 18, 20 and 22, the former of which can be used as a drive roller and the latter of which can be used to provide suitable tensioning of the photoreceptor belt 10. Motor 23 rotates roller 18 to advance belt 10 in the direction of arrow 16. Roller 18 is coupled to motor 23 by suitable means such as a belt drive.

Figure 2:
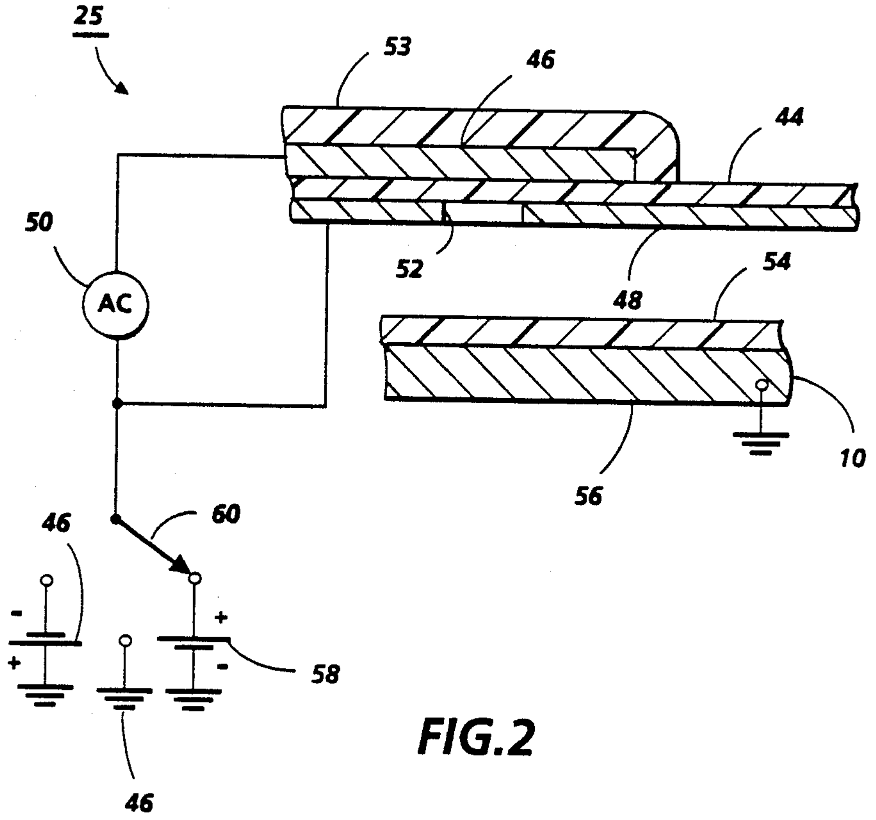
FIG. 2 is a fragmentary cross-sectional elevation view showing the marking head of an ion projection printing apparatus representing the invention.

As can be seen by further reference to FIG. 2, initially successive portions of belt 10 pass through an imaging station A. At the imaging station A, a tri-level, latent electrostatic image is formed on the dielectric belt. To this end, there is provided an ion generation device 25 which will be discussed in greater detail with respect to FIG. 3.

At development station B, a magnetic brush development system, indicated generally by the reference numeral 30 advances developer materials into contact with the electrostatic latent images. The development system 30 comprises first and second developer housings 32 and 34. Preferably, each magnetic brush development housing includes a pair of magnetic brush developer rollers. Thus, the housing 32 contains a pair of rollers 35, 36 while the housing 34 contains a pair of magnetic brush rollers 37, 38. Each pair of rollers advances its respective developer material into contact with the latent image. Appropriate developer biasing is accomplished via power supplies 41 and 43 electrically connected to respective developer housings 32 and 34.

As illustrated in FIG. 2, the ion generation device 25 comprises a plurality of dielectric members 44 preferably fabricated from mica. The dielectric members 44 are sandwiched between a pair of conducting electrodes 46 and 48. A source of alternating power 50 applied to the electrodes 46 and 48 causes air gap breakdown between the electrode 48 and the dielectric 44 thereby producing positive and negative ions. The positive and negative ions are extracted through an aperture 52 provided in the electrode 48 for such purpose. An insulative coating or layer 53 precludes air breakdown between the electrode 46 and the dielectric 44.

The receptor 10 on which the ions are selectively deposited in image configuration comprises a dielectric layer 54 supported upon a conductive substrate 56. In order to deposit positive images on the receptor 10 a positive DC bias 58 is applied to the ion generation device 25 via a multiple position switch 60. The applied DC voltage establishes an electrostatic field between the ion generation device and the receptor which causes positive ions to be deposited. In like manner, negative images are deposited on the receptor 10 by applying a negative DC bias to the ion generation device 25 via the multiple position switch 60. With a negative bias on the ion generation source, an electrostatic field is established between the ion generator and the receptor which causes negative ions to be deposited on the receptor. Background areas are created on the receptor by connecting the ion generation device 25 to a source 60 close ground potential.

The electrostatic images formed on the receptor are rendered visible by two different color toners of different polarities which are applied via the magnetic brush rollers 35,36 and 37,38. After the images have been rendered visible with the different color toners, a sheet of support material 86 is moved into contact with the toner images at transfer station C. The sheet of support material is advanced to transfer station C by conventional sheet feeding apparatus, not shown. Preferably, sheet feeding apparatus includes a feed roll contacting the uppermost sheet of a stack copy sheets. Feed rolls rotate so as to advance the uppermost sheet from stack into a chute which directs the advancing sheet of support material into contact with photoconductive surface of belt 10 in a timed sequences so that the toner powder image developed thereon contacts the advancing sheet of support material at transfer station C.

Because the composite image developed on the belt consists of both positive and negative toner, a pre-transfer corona discharge member 88 is provided to condition the toner for effective transfer to a substrate using corona discharge.

Transfer station C includes a corona generating device 90 which sprays ions of a suitable polarity onto the backside of sheet 86. This attracts the charged toner powder images from the belt 10 to sheet 86. After transfer, the sheet continues to move, in the direction of arrow 92, onto a conveyor (not shown) which advances the sheet to fusing station D.

Fusing station D includes a fuser assembly, indicated generally by the reference numeral 94, which permanently affixes the transferred powder image to sheet 86. Preferably, fuser assembly 84 comprises a heated fuser roller 96 and a backup roller 98. Sheet 86 passes between fuser roller 86 and backup roller 88. with the toner powder image contacting fuser roller 86. In this manner, the toner powder image is permanently affixed to sheet 86. After fusing, a chute, not shown, guides the advancing sheet 86 to a catch tray, also not shown, for subsequent removal from the printing machine by the operator.

After the sheet of support material is separated from surface of belt 10, the residual toner particles carried by the non-image areas on the belt are removed therefrom. These particles are removed at cleaning station E.

What is claimed is:

1. Apparatus for depositing ions on a charge receptor, said apparatus comprising:
- means for generating positive and negative ions;
- means for selectively effecting extraction of positive or negative ions from said generating means and depositing them on a charge receptor, said means for selectively effecting extraction of positive or negative ions effecting extraction of positive and negative ions in image configuration to thereby form positive and negative images on said receptor; and
- means for developing images formed by said positive ions with a first type of toner; and
- means for developing images formed by said negative ions with a second type of toner.

2. Method of depositing ions on a charge receptor, said method including the steps of:
- generating positive and negative ions;
- selectively effecting extraction of positive or negative ions from said generating means and depositing them on a charge receptor, said step of selectively effecting extraction effecting extraction of positive and negative ions in image configuration to thereby form positive and negative images on said receptor; and
- developing images formed by said positive ions with a first type of toner; and
- developing images formed by said negative ions with a second type of toner.

3. Apparatus according to claim 1 wherein said means for developing images comprises different color toners.

4. Apparatus according to claim 3 wherein said means for generating ions comprises a single source of positive and negative ions.

5. Apparatus according to claim 4 wherein said single source comprises a pair of electrodes spaced apart by a dielectric member and a source of AC power is applied to said pair of electrodes.

6. Apparatus according to claim 5 wherein said means for selectively effecting extraction of positive or negative ions comprises a plurality of switches operatively coupling positive and negative DC voltages to said single source to thereby establish electrostatic fields between said single source and said receptor.

7. The method according to claim 2 wherein said first and second types of toner are different colors.

8. The method according to claim 7 wherein said step of generating positive and negative ions comprises using a single source of both positive and negative ions.

9. The method according to claim 8 wherein said single source comprises a pair of electrodes spaced apart by a dielectric member and a source of AC power is applied to said pair of electrodes.

10. The method according to claim 9 wherein said means for selectively effecting extraction of positive or negative ions comprises a plurality of switches operatively coupling positive and negative DC voltages to said single source to thereby establish electrostatic fields between said single source and said receptor.

* * * * *